United States Patent [19]

Miller et al.

[11] Patent Number: 4,919,509
[45] Date of Patent: Apr. 24, 1990

[54] MECHANICAL CONNECTION FOR POLARIZATION-MAINTAINING OPTICAL FIBER AND METHODS OF MAKING

[75] Inventors: Calvin M. Miller, Duluth; David N. Ridgway, Conyers; Frederick M. Sears, Norcross, all of Ga.

[73] Assignee: AT&T Bell Laboratories, Murray Hill, N.J.

[21] Appl. No.: 306,414

[22] Filed: Feb. 3, 1989

[51] Int. Cl.⁵ .............................................. G02B 6/38
[52] U.S. Cl. ................................................. 350/96.21
[58] Field of Search ................ 350/96.21, 96.20, 96.22

[56] References Cited

U.S. PATENT DOCUMENTS 4,691,986  9/1987  Aberson et al. .................. 350/96.21

Primary Examiner—William L. Sikes
Assistant Examiner—Robert E. Wise
Attorney, Agent, or Firm—Edward W. Somers

[57] ABSTRACT

A mechanical connection arrangement for two polarization-maintaining optical fibers (20—20) includes two ferrules (40—40). Each of the optical fibers to be connected includes an outer cladding layer (23) having a hybrid cross section transverse to a longitudinal axis of the fiber. The hybrid cross section is defined by two parallel sides and by two generally arcuate end portions. One of the polarization axes of the fiber is parallel to the parallel sides of the fiber. The ferrules were adjacent portions in a length (110) of stock material and are positioned in support means such that end faces of the ferrules which were contiguous to each other prior to the ferrules being separated from the length of material are adjacent to each other in the connection arrangement. Each ferrule prior to separation has a tab (126) associated therewith such that the tab of the adjacent portions are aligned longitudinally. An end portion of each optical fiber to be connected is disposed in a substantially rectangular passageway (122) formed through a ferrule and terminating in an end face. Each tab is normal to a long side of the rectangular passageway of the associated ferrule and hence is normal to the parallel sides of the outer cladding layer cross section of the optical fiber disposed therein. The ferrules are held to cause the tabs to be aligned longitudinally thereby causing the angular orientation of the polarization axes and the cores of the connected fibers to be aligned.

23 Claims, 5 Drawing Sheets

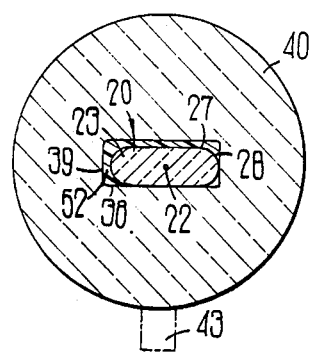
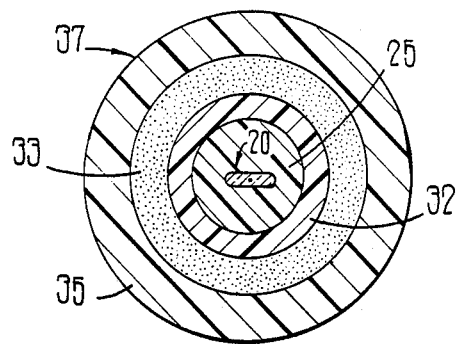
FIG 1  FIG 2
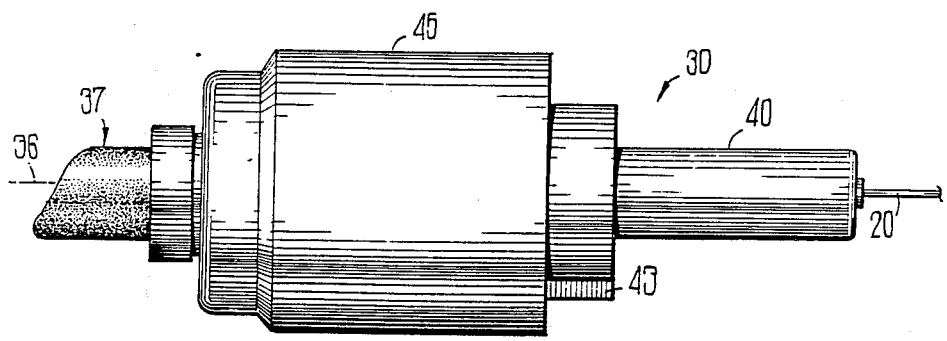
FIG 3
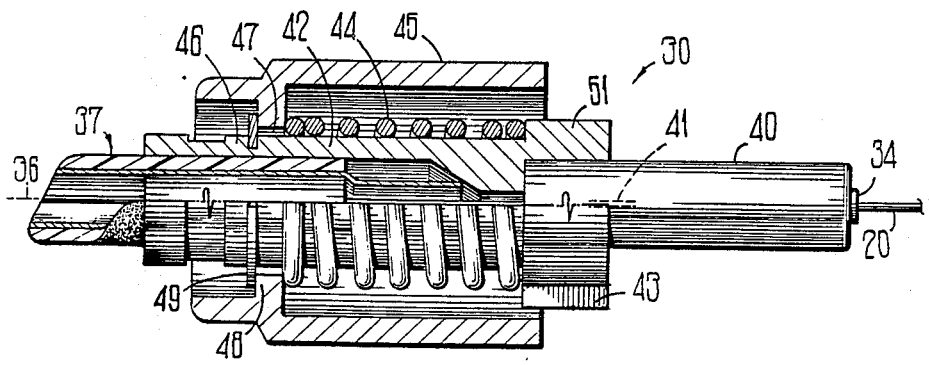
FIG 4

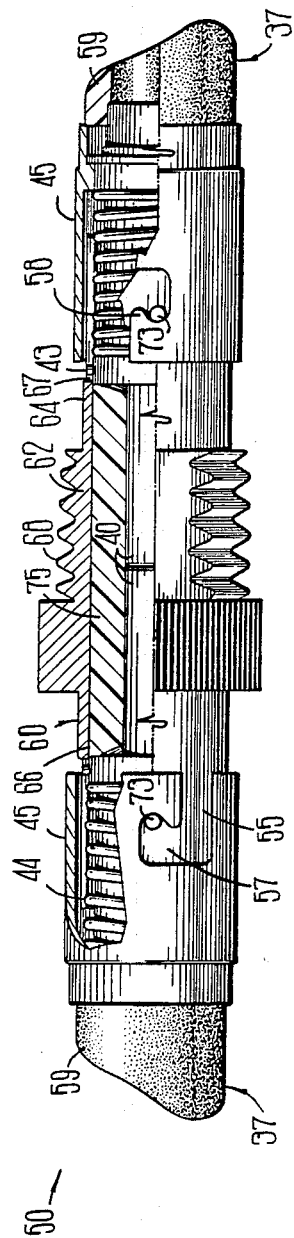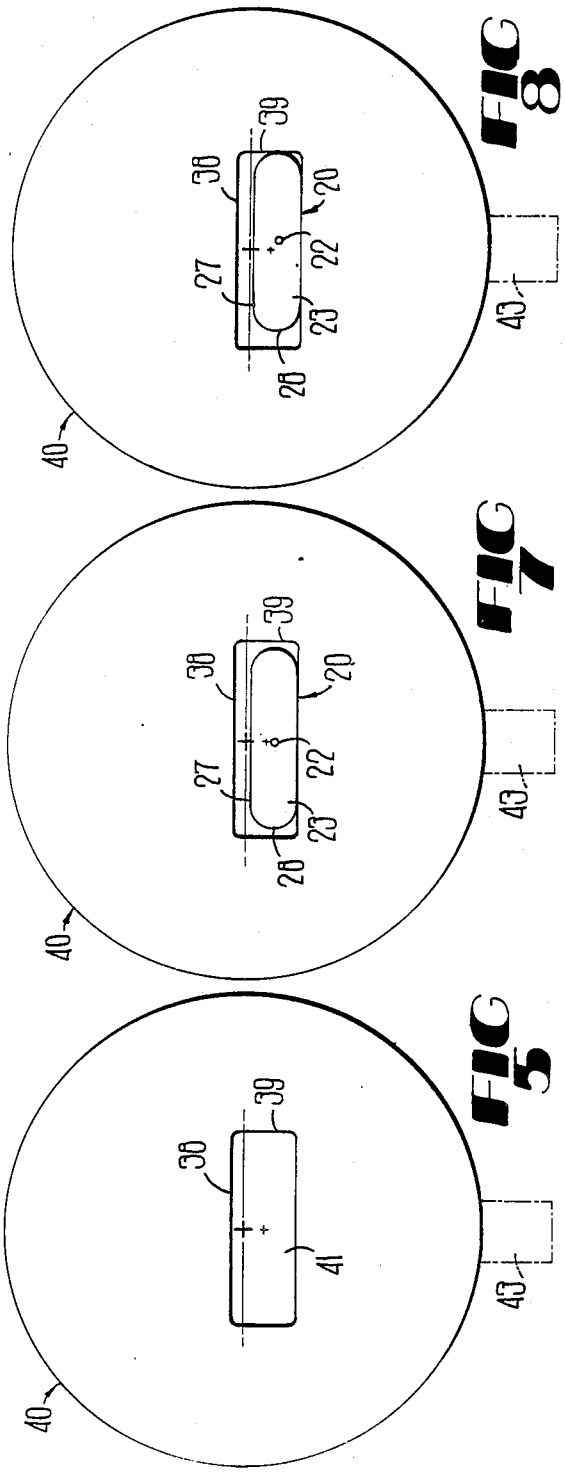

MECHANICAL CONNECTION FOR POLARIZATION-MAINTAINING OPTICAL FIBER AND METHODS OF MAKING

TECHNICAL FIELD

This invention relates to a mechanical connection for polarization - maintaining optical fiber and methods of making. More particularly, it relates to a mechanical arrangement which is capable of being used to connect or to splice, polarization-maintaining fibers.

BACKGROUND OF THE INVENTION

Polarization-maintaining (PM) fibers sustain a substantially stable state of polarization in single-mode transmission and are important in applications such as coherent communications, fiber devices and sensors and photonic switching. One type of polarization-maintaining fiber is a stress-induced birefringent optical fiber disclosed in U.S. Pat. No. 4,274,854 which issued to W. Pleibel, et al. on June 23, 1981. See also U.S. Pat. Nos. 4,515,436 and 4,529,426 which issued on May 7, 1985 and July 16, 1985, in the names of R. E. Howard, et al. and W. Pleibel, et al., respectively.

Suitable connection technology for fibers is essential to the successful use of polarization-maintaining fiber. The suitable connection technology must preserve a low loss and minimize polarization extinction ratio degradation for the optical fiber. Polarization extinction ratio is defined as the logarithym of the ratio of power leakage, which is orthogonal to the excited polarization axis, to that of the total launched power. Splice loss depends only on the transverse and longitudinal offset of the fiber cores whereas the extinction ratio depends only on the angular offset between the polarization axes of the two fibers. Accordingly, in order to obtain acceptable properties through a connection, it is important to align not only the fiber cores, but also the polarization axes.

Alignment of the polarization axes of the two fibers to be interconnected, which is very important, must be within a tolerance of about 1°; otherwise the extinction ratio is degraded substantially. The task of aligning the polarization axes would be simplified if the polarization axes coincided with the geometric axes of the optical fiber cross section. Generally, however, polarization-maintaining fibers do not have geometric axes that coincide with the polarization axes. For a circular cross-section optical fiber, for example, expensive apparatus must be used for a determination of the direction of the polarization axes. However, a polarization-maintaining optical fiber having a generally rectangular transverse cross sectional configuration of an outer cladding layer, for example, is beneficial and brings the geometric axes and the polarization axes into coincidence. It facilitates the determination of the direction of the polarization axes.

In the prior art, most polarization-maintaining fiber splicing techniques have used fusion or adhesive bonding. Fusion splicing requires expensive micropositioners to align the cores in addition to rotational stages to search for the polarization axes of the fundamental mode. Furthermore, problems occur in polarization-maintaining fiber splicing when the residual stress profile of a fiber is deformed due to dopant diffusion during fusion and core deformation in stress-induced fibers. Adhesive bonding has shown some instabilities due to volume shrinkage during a curing process.

Another consideration derives from the fact that in many applications, only a relatively short length of polarization-maintaining fiber is required. Should there be misalignment of the optical fiber cores and birefringent axes, undesired effects such as excessive overall attenuation or a reduction in the signal-to-noise ratio due to polarization noise, modal noise and reflection loss may occur. In some instances, reflections can contribute to laser instability through optical feedback.

What is sought after is a passive mechanical connection system for polarization-maintaining optical fibers. The desired connection system should combine and simplify fiber end preparation, fiber core and polarization axes alignment. End preparation which is accomplished by mounting the fibers in a supporting structure and polishing provides connection components that are easier to align than bare fiberes. Also needed is alignment hardware which does not require subsequent operations for alignment retention. A mechanical connection system for polarization-maintaining fibers would eliminate the problem of stress profile deformation during fusion and volume shrinkage instabilities due to adhesive bonding. Furthermore, a passive connection system for polarization-maintaining fibers is desired. the sought-after passive system should be one which facilitates accurate alignment of polarization-maintaining optical fiber cores and axes without the need for the elaborate micropositioners that have been used in the past. As far as is known, the prior art does not include such a mechanical connection arrangement for polarization - maintaining fibers.

SUMMARY OF THE INVENTION

The foregoing probelms of the prior art have been overcome with the mechanical connection system of this invention. It should be noted that for purposes of this invention, the term mechanical connection system or connection is intended to include connectors or splices as those terms are used in the art. The system includes a polarization-axis reference which is external to an optical fiber to facilitate accurate axial alignment of two polarization-maintaining optical fibers without the need for expensive and elaborate micropositioners. In a preferred embodiment, the system includes two ferrules having passageways each of which is defined by at least one substantially straight line. Polarization-maintaining optical fibers each having a hybrid outer cladding configuration, which is defined by at least one substantially straight line that is parallel to one of the polarization axes of the optical fiber, are inserted into the passageways. Each ferrule has a marking associated therewith in a predetermined orientation with respect to the substantially straight line of the hybrid cross section of the outer cladding layer of the optical fiber end portion in the ferrule and hence with respect to one of the polarization axes of the fiber. The connection system facilitates alignment of the markings and hence passive alignment of the polarization axes of the fibers. Extinction ratio measurements may be performed on the mechanical connection to carry out active alignment of the polarization-maintaining fibers to enhance the alignment. However, such active alignment is not necessary to provide an acceptable mechanical connection for the two polarization-maintaining fibers.

It should be understood that the polarization-maintaining optical fiber includes several cladding layers, an outer one of which may be the starting substrate tube. It is the outer cladding layer which has the hybrid configuration in a cross-section transverse to a longitudinal axis of the optical fiber.

In the preferred embodiment, each connector of the connection system includes a ferrule and a plastic housing in which is disposed an end portion of the ferrule. An end fact of a free end portion of a first ferrule is destined to become disposed adjacent to the end face of a free end portion of a second ferrule. Each ferrule has a passageway extending therethrough, at least a portion of which that opens to an end face of the free end portion is substantially rectangular in a cross section transverse to a longitudinal axis of the ferrule. Prior to the separation of two ferrules from a length of stock, each plastic housing is fitted with a tab such that the tab is perpendicular to the long sides of the rectangular shape of the passageway. Optical fiber to be received in the passageway of each ferrule includes an outer cladding layer which has a hybrid configuration comprising two ends and two parallel sides such that one of the orthogonal polarization-axes of the optical fiber is parallel to the parallel sides of the outer cladding. As a result, when an end portion of a polarization-maintaining fiber is positioned in the rectangular passageway, the associated tab is normal to the parallel sides or flats of the fiber which are parallel to one of the polarization axes of the fiber. For a connection, two of the ferrules are supported with their tabs aligned thereby causing the polarization axes of the optical fibers to be aligned.

In the preferred embodiment, the first and second ferrules are contiguous segments of a length of cylindrical stock. The first and second ferrules after having been separated from the stock are arranged so that their adjacent end faces in a connection system were contiguous prior to separation from the stock. further, the first and second ferrules after separation are caused to have the same rotational orientation with respect to a longitudinal axis of the connection system as the ferrules had prior to their separation from the stock.

BRIEF DESCRIPTION OF THE DRAWING

Other features of the present invention will be more readily understood from the following detailed description of specific embodiments thereof when read in conjunction with the accompanying drawings, in which:

FIG. 1 is an end view of an end portion of a polarizationmaintaining optical fiber disposed in a passageway of a ferrule with an identification tab disposed in a predetermined orientation with respect to polarization axes of the optical fiber;

FIG. 2 is an end view of an optical fiber enclosed in a buffer layer, a strength system and a jacket;

FIG. 3 is a side elevational view of an optical fiber termination assembly which includes a ferrule with an optical fiber disposed therein and a housing in which the ferrule is mounted;

FIG. 4 is an elevational view partially in section of the termination assembly of FIG. 3;

FIG. 5 is an end view of a ferrule which shows a rectangular passageway disposed eccentrically with respect to a longitudinal axis of the ferrule;

FIG. 6 is a side elevational view of two terminated optical fibers after their interconnection;

FIG. 7 is an end view of the ferrule of FIG. 5 with an optical fiber positioned therein;

FIG. 8 is an end-view of the ferrule of FIG. 7 after the optical fiber has been repositioned within the passageway;

DETAILED DESCRIPTION

Figure 9:
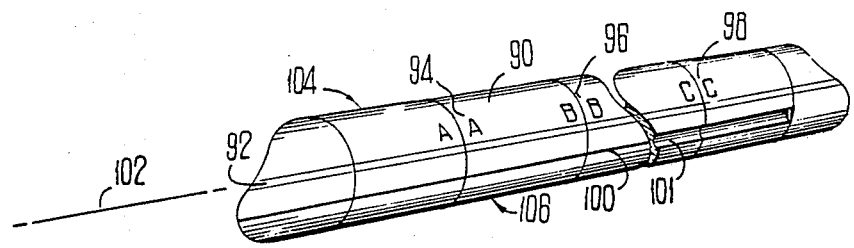
FIG. 9 depicts schematically a length of tubular stock comprising several ferrule segments.
Figure 10:
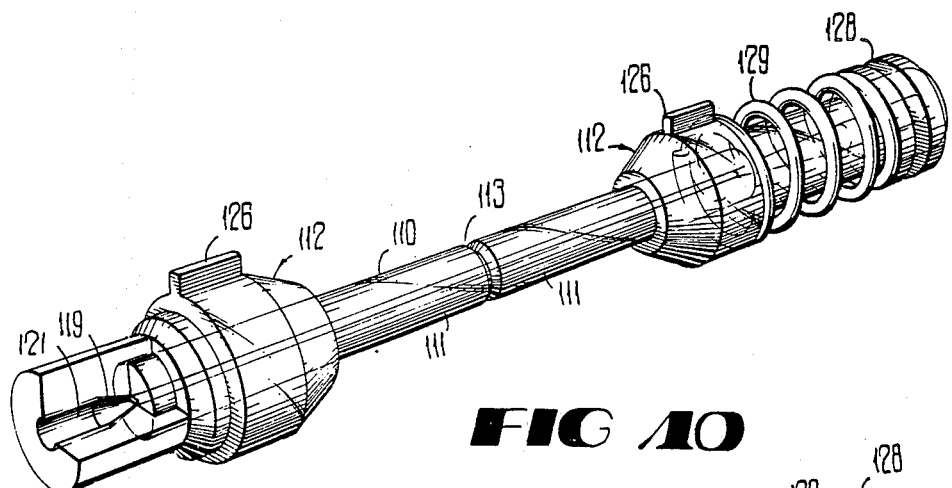
FIG. 10 depicts a two ferrule segment portion of tubular stock prior to separation and having rotational identification means.

Referring now to FIG. 1, there is shown a polarization-maintaining optical fiber 20. The polarization-maintaining optical fiber 20 includes a core 22 and a plurality of cladding layers. As a result of the differential thermal contraction of the layers, stress-induced birefringence is caused when the preform tube is collapsed. An outer cladding layer 23 has a hybrid configuration in a direction transverse to a longitudinal axis of the fiber. The hybrid configuration is such that it is defined by at least one substantially straight line. In the following description, the outer cladding layer 23 includes a rectangular portion having substantially parallel sides 27—27 and arcuately shaped end portions 28—28 each of which is connected to the two parallel sides. It should be understood that at times the end portions may have very little or substantially no curvature. About the outer cladding 23 is disposed a coating 25 (see FIG. 2) which may be a UV cured acrylate material. As can be seen in FIG. 2, the coating 25 has a circular configuraton.

The polarization-maintaining fiber is manufactured to cause orthogonal polarization axes thereof to have a predetermined orientation with respect to the at least one substantially straight line which defines the outer cladding. That straight line is parallel to at least one of the polarization axes and hence normal to the other. In the embodiments described herein, the polarization axes have a predetermined orientation with respect to the sides 27—27 and the end portions 28—28, respectively, which define the configuration of the outer cladding layer. That orientation is such that one of the polarization axes of the optical fiber is parallel to the parallel sides 27—27 of the cross sectional configuration of the outer cladding layer 23.

Each of the fibers may be provided with a buffer layer 32 (see FIG. 2) of PVC for example, and a strength member 33 such as one made of KEVLAR® fibrous material, for example. An outer jacket 35 which may be comprised of PVC (see FIG. 2) encloses the buffer layer 32. The completed structure is referred to as a single fiber cable and is designated by the numeral 37.

Referring now to FIGS. 3-4 there is shown a portion of one device 30 which is used to terminate a polarization-maintaining optical fiber and facilitate the mechanical connection of two polarization-maintaining optical fibers. The device 30 may be referred to as a termination device.

A connection comprises two optical fiber termination assemblies each including a termination device 30 and an end portion of a length of polarization-maintaining optical fiber. Corresponding elements of the termination assemblies are identified with the same numerals. The connection is such that longitudinal axes 36—36 of the termination devices are coaxial. In addition to an end portion of an optical fiber 20, each termination assembly comprises an optical fiber ferrule or plug 40, having a passageway 41 (see FIG. 4) and being made of a glass or ceramic material, for example. The passageway 41 has a cross section which is defined by at least one straight side, and generally has a configuration similar to that of the optical fiber end portion received therein. In the embodiments described herein, the passageway 41 has a cross-section transverse to a longitudinal axis of the ferrule which is substantially rectangular (see FIG. 5) and which is at least slightly larger than the largest expected transverse cross-section of uncoated optical fiber to be terminated therewith. The passageway 41 is defined by long sides 38—38 and by short sides 39—39. Corners of walls which define the passageway are formed with a slight radius which is substantially less than the radii of the end portions 28—28 of the outer cladding layer of the optical fiber. The ferrule 40 has an outer diameter of about 2500 microns. An end face 34 of the plug 40 includes an opening of the passageway 41.

In terminating a cable 37, the coating 25, as well as the buffer layer 32, strength member 33 and outer jacket 35, is removed from an end portion of an optical fiber 20 prior to its termination with a ferrule 40. Then a hybrid-shaped, uncoated end portion of optical fiber is inserted into the rectangular passageway 41 of each ferrule 40. The end portion of the optical fiber 21 is secured within the passageway 41 of the ferrule 40 in accordance with this invention and the end faces of the optical fiber and of the ferrule are ground and polished.

Each termination assembly also includes a connector body 42 (see FIGS. 3-4) made of a plastic or metallic material, a compression spring 44 and a tubular housing 45 made of a metallic material. It should be noted that the ferrule 40, the connector body 42 and the housing 45 each has a cylindrical cross-section.

The connector body 42 includes a separate orienting means such as a key or tab 43 (see also FIG.1), for example, which projects radially from the longitudinal axis 36. Importantly, the tab 43 is oriented to be normal to the long sides 38—38 of the rectangular passageway 41 and hence is normal to the parallel sides 27—27 of the polarization-maintaining fiber 20.

The connector body 42 includes a small diameter portion 46 (see FIG. 4) which extends through an opening 47 in an internally disposed collar 48 in the housing. A retaining washer 49 circumscribes the small diameter portion on the outer side of the collar. The spring 44 is disposed about the smaller diameter portion 46 of the connector body 42 between the collar and a large diameter portion 51. As a result of this arrangement, the spring 44 biases the connector body 42 outwardly from the cable to hold the connector body within the housing 45.

Viewing now FIG. 6 which shows a connector 50, it can be seen that the housing 45 may include a longitudinally extending slot 55 which at its inner end communicates with a circumferentially extending slot 57. The slot 57 is formed so that the tubular wall of the housing which defines it includes latching projection 58. These slots 55 and 57 are used for securing a termination device 30 to another portion of the connector.

Completing each connector termination device 30 as is shown in FIG. 6 is a portion 59 which may extend from the housing 45 along the optical fiber cable in a conically shaped configuration. This portion of the connector 50 provides strain relief for the termination and ensures that the cable can withstand repeated bends in use after interconnection with another cable without undue stresses being imparted to the optical fibers.

An optical fiber 20 is prepared for termination with a ferrule 40 by removing the coating from an end portion of the fiber. The end portion of the optical fiber is then inserted and secured in one of the ferrules having a designated direction of eccentricity by suitable means such as, for example, by an adhesive, preferably a UV-curable adhesive 52 (see FIG. 1). The portion of the optical fiber which protrudes from an end face of the ferrule (see FIGS. 3 and 4) is scribed and broken after which the optical fiber and ferrule end faces are polished by techniques well known in the art.

In accordance with this invention, steps are taken to reduce loss attributed to misalignment of fiber axes and to eccentricity of the optical fiber within the rectangular ferrule passageway 41 because the transverse cross section of the ferrule passageway is slightly larger than the largest transverse cross section of an optical fiber to be received therein. The ferrule passageway may have dimensions that are as much as about 5 microns larger than those of the polarization-maintaining optical fiber end portion received therein. Generally, each side of the rectangular passageway is about 3 microns greater than the corresponding side of the polarization-maintaining fiber. In a preferred embodiment, the ferrules are made with the passageways having a short side of about 74 microns and a long side of about 143 microns to accommodate optical fiber having a transverse cross section with overall outer dimensions of about 70 microns by 140 microns. As a result of these tolerances in passageway cross section, costs are reduced.

Suitable alignment is accomplished first by causing the outer cladding layer of the polarization-maintaining fiber to have the hereinbefore-described hybrid configuration transverse to the longitudinal axis of the optical fiber. An end portion of the optical fiber is positioned in a passageway of a ferrule (see FIG. 7), the passageway having a rectangular configuration which is larger than that of the fiber received therein. The positioning is such that the long sides 27—27 of the optical fiber cladding layer 23 are parallel to the long sides 38—38 of the passageway 41. Then as mentioned hereinbefore the ferrule is provided with a tab 43 such that the tab extends radially of the ferrule and such that it is perpendicular to the long side 38 of the rectangular passageway 41 in the ferrule. In general, the tab 43 is in a predetermined orientation with respect to at least one straight side which defines the passageway and hence in a predetermined orientation with respect to the at least one straight side of the hybrid configuration of the outer cladding layer of the optical fiber end portion disposed therein and to the polarization axes of the optical fiber end portion.

Futher, the optical fiber end portion may be caused to be disposed within the passageway 41 in a predetermined orientation with respect to the passageway and with respect to the direction of any eccentricity of the passageway in which it is disposed. In a preferred embodiment, should the passageway be disposed eccentrically as shown in FIG. 5, then the end portion of the optical fiber 20 is caused to be biased in the oversize passageway toward the outermost long side 38 of the ferrule passageway (see FIG. 7). Of course, it should be understood that the predetermined orientation could be such that the optical fiber is biased against the wall of the passageway in a direction opposite to the direction of eccentricity. What is important is that each ferrule which is used in the connection have the optical fiber end portion in its associated passageway in the same orientation with respect to the oversize passageway and to the direction of any eccentricity as that of the ferrule to be connected thereto. That orientation may be predetermined by determining the direction of eccentricity of the ferrule passageway prior to securing the optical fiber end portion therein. Further, each optical fiber end portion also is caused to be biased toward a short side of the passageway in which it is disposed (see FIG. 8). Each fiber is terminated so that it is biased in the same direction toward the same short side 39 of the rectangular passageway.

Two of the devices 30—30 are supported with their axes 36—36 being coaxial. Should the tabs 43—43 be aligned and should the fibers in the passageways be aligned, extinction ratio degradation and transmission loss are minimized. It will be observed that if the tabs 43—43 are aligned, then the passageways 41—41 of the two devices are such that the optical fiber end portions therein are aligned.

Each of the connector bodies 42—42 and ferrules 40—40 is adapted to be received in a coupling designated generally by the numeral 60 (see FIG. 6). The coupling 60 includes a tubular member 62 having end portions 64 and 66 with each end portion including a longitudinally extending slot 67. In order to allow the connector 20 to be panel-mountable, the coupling 60 includes a center portion 68 which is threaded and which is adapted to be inserted into a hole (not shown) in a panel. Also included in the coupling 60 at each end portion 64 and 66 thereof are assembly pins 73—73 which are displced circumferentially from the slot 67 at that end. See also U.S. Pat. Nos. 4,738,507 and 4,738,508 which issued in the name of J. M. Palmquist on Apr. 19, 1988.

In assembling the connector 50 which is shown in FIG. 6, an installer panel-mounts the coupling 60 or otherwise positions it to receive the termination devices 30—30. Mounted within the coupling 60 is a sleeve 75. The sleeve 75 is provided with a longitudinal slit through the wall thereof and is adapted to receive the ferrules 40—40 of the termination devices 30—30 and is a means for aligning the outer surfaces of the plugs. The sleeve 75 is disposed within the coupling 60 such that it floats to allow for some movement of the ferrules 40—40 when they are inserted into the coupling. Further, the sleeve 75 causes the longitudinal axes 36—36 of the ferrules 40—40 mounted therein to be coaxial.

An installer, in assembling the connector 50, inserts the ferrule 40 of one of the terminations devices 30—30 into the sleeve 75 with the pin 73 of the coupling being received in the longitudinally extending slot 55 of the termination device. At the same time, the installer has caused the tab 43 which extends radially from the connector body 42 of the one termination device 30 to be received in a longitudinal slot 67 of the coupling 60. The movement of the ferrule 40 is discontinued when the tab 43 engages an inner end of the wall which defines the slot 67. Continued movement of the housing 45 against the bias of the spring 44 causes the housing to override the connector body. When the pin 73 at the one end of the coupling 60 reaches an inner end of the longitudinally extending slot 55, the operator turns the housing 45 to cause the pin 73 to become disposed and secured within the circumferentially extending slot 57 behind the latching portion 58 (see FIG. 6). It should be observed that the housing 45 is free to turn about the plug 40 and its associated connector body 42. This allows the housing 45 to be turned independently of the connector body 42 to cause the pin 73 to become disposed behind the latching portion 58.

After these steps, the installer repeats foregoing the procedure with respect to the other termination device 30 to cause the ferrule 40 thereof to be received within the floating sleeve 75. The geometries of the coupling 60 and of the terminations 37—37 are such that when the ferrules 40—40 are received within the floating sleeve 75, and the tabs 43—43 bottomed out in the slots 67—67 of the coupling 60, end faces of the ferrules 40—40 may abut each other. Also, with the pins 43—43 aligned, the polarization axes of the optical fiber end portions have the same predetermined orientation with respect to the ferrule passageways. As a result, transmission losses and extinction ratio degradation through the connector 50 are minimized.

In a preferred embodiment, the ferrules are those of a prealigned rotary splice connector disclosed and claimed in priorly identified U.S. Pat. No. 4,691,986, which is incorporated by reference hereinto. Ferrules to be used in a connector are made from contiguous portions of a length of tubular stock 90 having a rectangular passageway 92 (see FIG. 9). As can be seen in FIG. 9, there are markings 94, 96 and 98 by which contiguous end faces of contiguous segments can be identified at a later time. The tubular stock 90 also includes means for identifying the angular relationship between contiguous ferrules, such as a line 100 or a groove 101 (see FIG. 9) that extends parallel to a longitudinal axis 102 of the stock. The line 100 or groove 101 need not extend the lengths of the segments. Ferrule segments can be identified by means of a short line that crosses the boundary between the segments. Such a line also would serve to identify the contiguous ends of contiguous ferrule segments. Further, although in the currently preferred embodiment, the ferrule segments are drawn glass, the invention is not so limited and the tubular stock may be made from any suitable material including ceramic, plastics or metal, for example, and shaped by processes other than drawing.

Two ferrule segments 104, 106 (see FIG. 9) which are contiguously located in the tubular stock are used for a connector. Care also is taken that the end faces of the ferrule segments in which the optical fibers terminate are contiguous prior to separation of the ferrule segments from the tubular stock. The rotational markings on the ferrule segments permit rotational alignment of the ferrules after termination. As will be recalled, each marking means is normal to the long parallel sides of the passageway, and hence to the long side of the polarization-maintaining fiber outer cladding and to one of its polarization axes. As a result, the polarization-maintaining axes of the two fibers are aligned.

The preferred embodiment of this invention will be described with respect to FIGS. 10-14. Therein, a length 110 of tubular stock material such as drawn glass, for example, comprising two ferrule segments 111—111 is terminated at each of its ends by a housing 112 (see FIG. 10) which typically is made of a plastic material such as polycarbonate. It should be observed that the preform has a circumferential V-groove 113 formed about its center plane. The housing 112 includes a cavity 114 (see FIG. 11) for receiving an end portion 115 of the stock length 110 and includes a small diameter portion 116. The small diameter portion 116 includes a passageway 118 which communicates with a tapered transition 119 from an enlarged passageway 121. The enlarged passageway 121 is adapted to receive an end portion of a buffered optical fiber to be terminated and from an end portion of which the buffer layer has been removed to expose an end portion of optical fiber. When the buffered optical fiber is received in the enlarged passageway 121, the exposed portion of the optical fiber extends through the transition section 119 and passageway 118 into a substantially rectangular passageway 122 (see FIG. 12) of ferrule segment 111.

The housing 112 also includes an enlarged portion 124 which is provided with a tab 126. During assembly of the housings 112—112 onto the end portions of the stock length 110, the housings are turned to cause the tabs to be aligned longitudinally.

Each tab 126 is attached to an associated segment in a predetermined manner. In the preferred embodiment, each tab 126 is attached to a segment to cause the tab to be perpendicular to the long side of the rectangular configuration of the passageway. As a result, when an end portion of the optical fiber 20 without its coating is disposed in the passageway, the tab 126 will be normal to parallel sides of the hybrid configuration of the outer cladding layer and hence normal to one of the polarization axes of the optical fiber.

Over a free end of each small diameter portion 116 is positioned a collar 128. A compression spring 129 is disposed concentrically about the small diameter portion 116 between the collar 128 and the enlarged portion of the housing and is adapted to snap-lock over a lip 125 of the housing 112.

Figure 13:
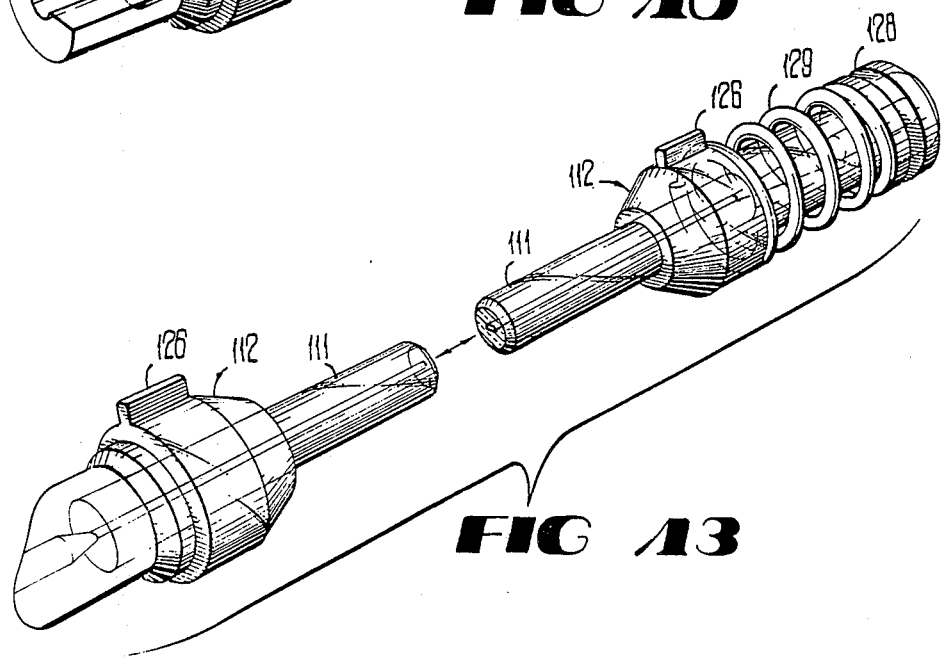
FIG. 13 depicts the two segment portion of the stock of FIG. 10 after separation.
Figure 11:
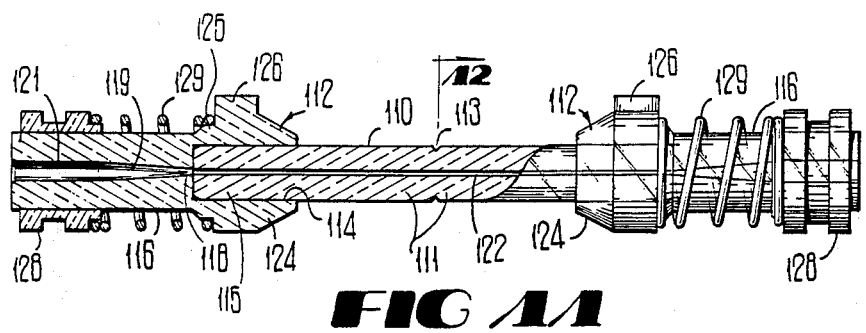
FIG. 11 is a side elevational view partially in section of the two ferrule arrangement of FIG. 10.
Figure 12:
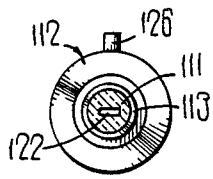
FIG. 12 is an end cross sectional view of the arrangement of FIG. 11 as taken along lines 12—12 thereof.

Afterwards, two of the marked ferrule segments 111—111 with housings 112—112 mounted thereon are separated from each other along the circumferential groove 113 and are used to terminate two optical fibers (see FIG. 13). As emphasized hereinbefore, the terminations are such that the end faces in which the optical fibers terminate were contiguous to each other when the ferrule segments were unseparated portions of the stock (see FIG. 10).

Also, the terminations are carried out so that each fiber end portion is disposed within its associated plug passageway in a predetermined orientation with respect to the direction of eccentricity of the passageway, as described hereinbefore. In the preferred embodiment, the end portion of each optical fiber is inserted into the passageway 122 of its associated ferrule segment 111 and biased in the direction of the tab 126 of the housing 112 in which the plug is mounted, that is toward the outside of the ferrule along a radial line that extends from the longitudinal centroidal axis of the ferrule through the tab 126. Also, each fiber end portion is positioned so that it is biased toward the same short side of the passageway as viewed from an end face of the fiber end portion (see FIG. 8).

Figure 14:
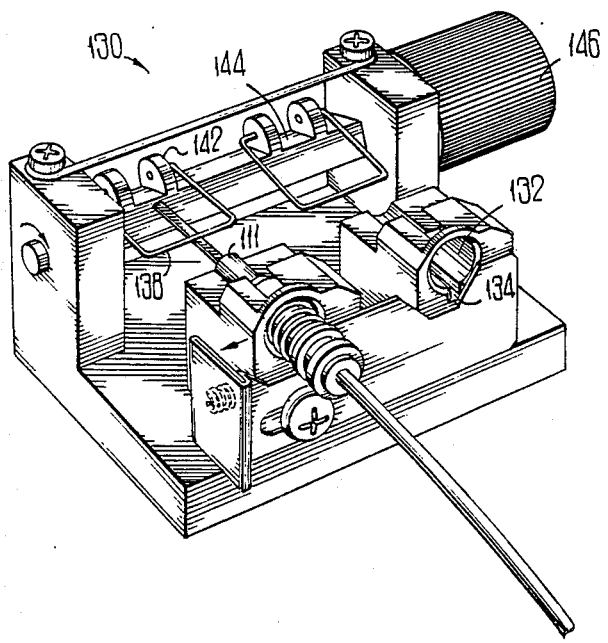
FIG. 14 shows an apparatus which is used to implement the connective arrangement of this invention.

An apparatus of this invention may be useful to position each optical fiber end portion in the passageway of a ferrule segment 111. Such an apparatus 130 may be one which is shown in FIG. 14 and which may be used to position simultaneously each of a plurality of fiber end portions in the same orientation with respect to passageways in associated ferrules. Each of a plurality of ferrule segments 111—111 which are mounted in housings 112—112 and which had been contiguous pairs from the same length 110 is positioned in a nest 132 in the apparatus 130. Each is positioned so that the tab 126 along each housing is received in a keyway 134 of the associated nest received therein. As can be seen in FIG. 14, the keyway 134 of each nest is oriented downwardly.

At this time, a curable adhesive material is injected by a syringe (not shown), for example, into each ferrule passageway. Such an adhesive may be UV-curable.

Then, an end portion of an optical fiber 20 which has had the coating 25 removed therefrom is inserted into one of the ferrule segments held in the apparatus 130. This step is repeated until each of the ferrules is provided with adhesive and an end portion of an optical fiber in its passageway.

As can be seen in FIG. 14, the apparatus is provided with a plurality of pivotally mounted wire-like bails 138—138. Each bail 138 is arranged so that a central portion thereof spans transversely an aligned optical fiber end portion of an aligned nest. The bails are supported from pintles 142—142 attached to a rod 144. A knob 146 is attached to an end of the rod 144. The bails are caused to be moved simultaneously pivotally by the turning of the knob 146 to engage the plurality of optical fibers adjacent to their entrances into the ferrules and then moved further to move the optical fiber end portions in the rectangular passageways into engagement with the lowermost long sides of the passageways as viewed in FIG. 8. It should be remembered that in such a position, each optical fiber is oriented in the direction of the tab 126 on the exterior surface of the housing 112 of the ferrule segment. Also, it will be recalled that the tab 126 is normal to the parallel sides of the outer cladding layer of the optical fiber. Because the tab 126 of each ferrule segment is in the same orientation with respect to the direction of any eccentricity of the passageway of a ferrule segment is in the same orientation with respect to passageway eccentricity as is the optical fiber end portion within the passageway of another ferrule segment of the same tubular stock.

Afterwards, each optical fiber is caused to be moved to cause it to engage with one of the short sides of the associated passageway (see FIG. 8). In a next step of making the connection, the adhesive material in each passageway is cured. The bails 138—138 are maintained in their moved positions, holding the optical fiber end portions in the lowermost portions of the passageways. Then the apparatus 130 is exposed to curing radiation such as UV energy to cure and harden the adhesive material in each passageway. As a result, each optical fiber end portion remains in its passageway in the same orientation with respect to the passageway.

It should be apparent that should the optical fibers be disposed in the ferrule passageways and biased toward the tabs 126—126, then the fibers each have the same orientation with respect to any eccentricity of the ferrule passageways relative to the centroidal axes of the ferrules. In the preferred embodiment, the direction of eccentricities has not been determined because the ferrule segments have the same rotational alignment relative to each other after separation from each other as before separation. The tab 126 of each may be in any orientation with respect to any eccentricity of its ferrule passageway; what is important is that both tabs have the same orientation. As a result, the eccentricity component attributed to the eccentricity of an optical fiber end portion with respect to an oversize passageway in which it is positioned has been eliminated substantially.

Further, the apparatus 130 is useful if there is no passageway eccentricity. The invention allows the use of an oversize passageway as described hereinbefore and ferrule segments are arranged such that the optical fiber in the passageway of each has the same orientation with respect to the ferrule passageway and hence with respect to the tab 126.

The splicing of the two optical fibers then is completed by inserting the two ferrule segments into a suitable alignment device. One such alignment device which is preferred is disclosed in priorly identified U.S. Pat. No. 4,545,644 which is incorporated by reference hereinto. The use of a prealigned rotary splice which includes the use of contiguous ferrule segments from the same tubular stock mounted in the alignment device of U.S. Pat. No. 4,545,644 is disclosed in priorly identified U.S. Pat. No. 4,691,986.

Figure 15:
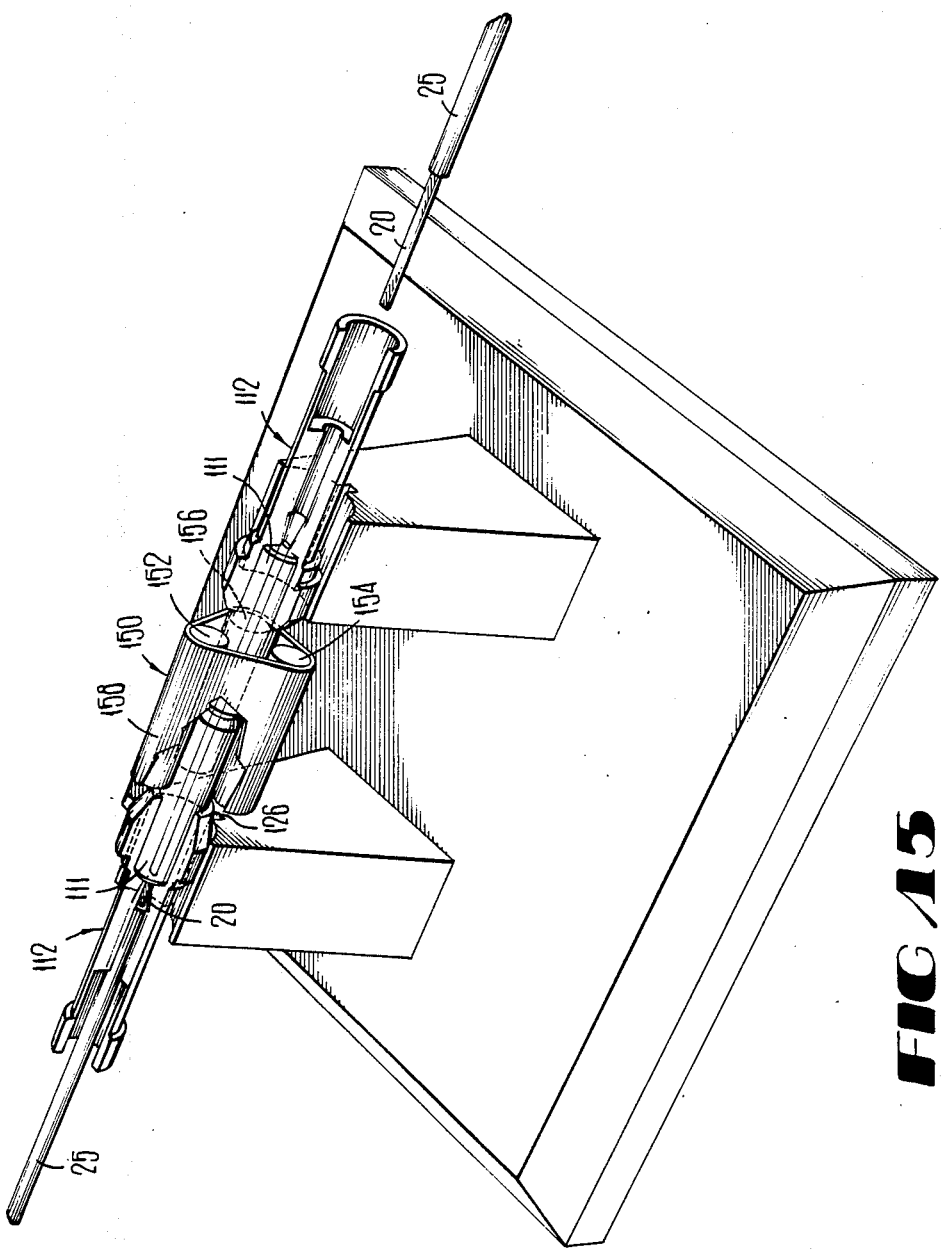
FIG. 15 shows schematically a three rod alignment means used in a connective arrangement of this invention.

A multi-rod alignment device 150 (see FIG. 15) such as is shown in the above-identified U.S. Pat. Nos. 4,545,644 and 4,691,986 includes three cylindrical alignment rods 152, 154 and 156 which are held within a flexible clip 158 such that the rods engage the ferrules after their insertion into the alignment means. It is desirable that the alignment rods have substantially the same coefficient of thermal expansion as the segments. The alignment rods 152, 154, and 156 may be turned to tune further the two ferrule segments 111—111 held within the alignment device 150.

Connectors according to the invention also comprise means for maintaining a constant axial relationship between the fiber ends after the insertion of the plugs into the alignment mans. Facilities for doing this are well known in the art and are not disclosed herein. Such facilities may include an organizer into which the ferrule assemblies and alignment device 150 is inserted. The organizer is such that insertion of the assembly requires movement of each collar toward its associated housing and attendant compression of the associated spring. It should be understood that the axial relationship can be such that the ferrule end faces are in contacting relationship with each other or spaced apart with an index matching material therebetween.

The groove 101 (see FIG. 9) which is formed longitudinally along the tubular stock 90 prior to separation of the ferrule segments, e.g. 111 and 111, from the stock may be used to identify the angular relationship between the contiguous ferrules. The groove facilitates the rotational alignment of the ferrules without visual observation. For example, when using the alignment rods of U.S. Pat. No. 4,545,644, the first ferrule segment 111 is inserted among the alignment rods such that one of the rods contacts the first ferrule along its groove. After the second ferrule segment 111 is inserted, it is turned rotatably until the same alignment rod contacts the second ferrule along its groove. This latter alignment may be signaled by a click that occurs as the rod enters the groove.

It is to be understood that the above-described arrangements are simply illustrative of the invention. Other arrangements may be devised by those skilled in the art which will embody the principles of the invention and fall within the spirit and scope thereof.

We claim:
1. A connection between polarization-maintaining fibers, said connection including:
   first and second ferrules each having an associated passageway extending therethrough and opening to an end face of a ferrule, each said passageway having a cross section transverse to a longitudinal axis of the associated ferrule which is defined by at least one substantially straight side;
   two polarization-maintaining optical fibers each having an end portion disposed in the passageway of one of said ferrules, each said optical fiber having an outer cladding layer which in a cross section transverse to the longitudinal axis is defined by at least one substantially straight side that is substantially parallel to said substantially straight side of said passageway of the ferrule in which the end portion is disposed and to one of orthogonal polarization axes of said each optical fiber;
   marking means being associated with each said ferrule and being disposed in a predetermined orientation with respect to said substantially straight side of said outer cladding layer of said fiber end portion disposed in the passageway of said each ferrule; and
   supporting means for holding said first and second ferrules to cause said marking means of said ferrules to be aligned longitudinally and hence to cause the polarization axes of one fiber end portion to be aligned with the polarization axes of the other fiber end portion.

2. A connection between polarization-maintaining fibers, said connection including:
   first and second ferrules each having a passageway extending therethrough and opening to an end face of the ferrule, each said passageway having a substantially rectangular cross section transverse to a longitudinal axis of said each passageway;
   two polarization-maintaining optical fibers each having an end portion disposed in the passageway of one of said ferrules, each said optical fiber having an outer cladding which has a hybrid outer configuration which in a cross section transverse to the longitudinal axis is defined by two ends and by two substantially parallel sides such that one of the polarization axes of said each optical fiber is substantially parallel to said parallel sides of said hybrid configuration;
   marking means being associated with each said ferrule and being disposed in a predetermined orientation to said parallel sides of the hybrid configuration of said fiber end portion disposed in the passageway of said each fiber; and
   supporting means for holding said first and second ferrules to cause said marking means of said ferrules to be aligned longitudinally and hence to cause the polarization axes of one fiber end portion to be aligned with the polarization axes of the other fiber end portion.

3. The connection of claim 2, wherein said marking means is normal to the parallel sides of the hybrid configuration of the optical fiber end portion.

4. The connection of claim 2, wherein each of said ferrules comprises a segment of tubular stock with the segments of said stock for said first and second ferrules being contiguous portions of said stock and such that contiguous end faces of the two portions of the stock which are to become said first and second ferrules are adjacent free end faces of the first and second ferruels which are held in said supporting means.

5. The connection of claim 4, wherein at least a portion of the length of tubular stock comprises a longitudinal groove formed along an outer surface thereof, said groove facilitating the identification of the rotational relationship of said first and second ferrules.

6. The connection of claim 4, wherein each of said ferrules prior to separation from each other has a free end thereof received in a cavity of a housing, said housing including a large diameter portion and a small diameter portion, said housing having a passageway therethrough which is aligned with said passageway in its associated ferrule segment when said ferrule segment is mounted therein, each said housing also including a tab as said marking means and said housings being assembled to said ferrule segments to cause the tabs on said housings to be aligned longitudinally.

7. The connection of claim 6, wherein each end of the hybrid cross sectional configuration of each optical fiber is generally arcuately shaped and wherein each of the terminated optical fibers is secured within its associated passageway such that the parallel sides of the outer cladding of each rectangularly configured fiber are normal to the tab of the associated housing.

8. The connection of claim 2, wherein the transverse cross section of each said passageway in each said ferrule is larger than the largest expected transverse cross section of an optical fiber end portion to be received therein.

9. The connection of claim 8, wherein each said optical fiber end portion is caused to be secured within its associated passageway so that the optical fiber is biased in a predetermined orientation with respect to the associated passageway.

10. The connection of claim 9, wherein one of said parallel sides and one of said ends of each optical fiber end portion are caused to be in engagement with corresponding long and short sides which define the passageway in which the end portion of the optical fiber is disposed.

11. A terminated polarization-maintaining optical fiber which is adapted to be connected to another polarization-maintaining optical fiber, said terminated polarization-maintaining optical fiber comprising:
a ferrule having an outer surface and a passageway which is adapted to receive an end portion of an optical fiber and which has a cross section transverse to a longitudinal axis of the ferrule which is defined by at least one substantially straight side;
a polarization-maintaining optical fiber having an end portion disposed in the passageway of said ferrule in a predetermined orientation with respect to said passageway, said optical fiber having an outer cladding layer which has a cross section transverse to the longitudinal axis of said ferrule defined by at least one substantially straight side such that one of the polarization axes of the optical fiber end portion disposed in the passageway is substantially parallel to the substantially straight side of the outer cladding layer; and
means associated with said ferrule and having a predetermined orientation with respect to said substantially straight side of the cross section of the outer cladding layer of said optical fiber and of said passageway for facilitating the alignment of said polarization-maintaining optical fiber with another terminated polarization-maintaining optical fiber.

12. A terminated polarization-maintaining optical fiber which is adapted to be connected to another polarization-maintaining optical fiber, said terminated polarization-maintaining optical fiber comprising:
a ferrule having an outer surface and a passageway which at lesat through a portion thereof has a substantially rectangular cross section transverse to a longitudinal axis of said ferrule and which is adapted to receive an end portion of an optical fiber and which has a cross section transverse to a longitudinal axis of the ferrule which is larger than that of the optical fiber to be received therein;
a polarization-maintaining optical fiber having an end portion disposed in the passageway of said ferrule in a predetermined orientation with respect to said passageway, said optical fiber having an outer cladding layer which is configured to have a hybrid cross section transverse to a longitudinal axis of said ferrule, said hybrid cross section being defined by two ends and by two substantially parallel sides such that one of the polarization axes of the optical fiber end portion disposed in the passageway is substantially parallel to the parallel sides of the hybrid configuration; and
means associated with said ferrule and having a predetermined with respect to said cross section of said optical fiber for facilitating the alignment of said polarization-maintaining optical fiber with another terminated polarization-maintaining optical fiber.

13. The terminated optical fiber of claim 12, which also includes a housing in which said ferrule is mounted, said housing including a marking thereon and said optical fiber end portion being disposed in said passageway of said ferrule in a direction which extends radially through said marking.

14. The terminated optical fiber of claim 13, wherein said marking includes a tab which is normal to the parallel sides of the hybrid cross section of the polarization-maintaining optical fiber.

15. The terminated optical fiber of claim 14, wherein the end portion of said polarization-maintaining fiber is disposed in said passageway of said ferrule such that one of the parallel sides and one of the ends of said hybrid cross section of said outer cladding layer are disposed in engagement with a corresponding long and short side of said passageway.

16. A method of connecting polarization-maintaining optical fibers, said method including the steps of:
providing a first ferrule having a longitudinally extending passageway therethrough, the passageway being adapted to receive an end portion of a polarization-maintaining optical fiber and having a transverse cross section which is a substantially rectangular configuration;
providing a second ferrule having a longitudinally extending passageway therethrough, the passageway being adapted to receive an end portion of a polarization-maintaining optical fiber and having a transverse cross section which is a substantially rectangular configuration;
inserting an end portion of a polarization-maintaining optical fiber which includes an outer cladding layer having a hybrid transverse cross section into the passageway of the first ferrule and another such end portion of a polarization-maintaining optical fiber into the passageway of the second ferrule, the hybrid cross section of each optical fiber being defined by two ends and by two substantially parallel sides such that one of the polarization axes of each fiber is substantially parallel to the parallel sides of the hybrid configuration;

providing a marking associated with each ferrule and being disposed in a predetermined orientation to the parallel sides of the outer cladding layer of the optical fiber end portion disposed therein; and supporting the ferrules to cause the markings associated with the ferrules to be aligned longitudinally and hence to cause the polarization axes of one fiber to be aligned with the polarization axes of the other fiber.

17. The method of claim 16, which also includes the step of causing one of the parallel sides and one of the ends of the end portion of the optical fiber in the passageway of the first ferrule to be aligned longitudinally with one of the parallel sides and one of the ends of the end portion of the optical fiber in the passageway of the second ferrule.

18. The method of claim 17, wherein each optical fiber is caused to be secured within its associated passageway so that the optical fiber is biased in a predetermined orientation with respect to the associated passageway.

19. The method of claim 18, which also includes the step of associating with each ferrule a marking such that the marking is normal to the parallel sides of the outer cladding layer of the optical fiber disposed within the passageway of the ferrule.

20. The method of claim 19, wherein the end portion of each optical fiber is disposed in its associated passageway to cause one of the parallel sides and one of the ends of the outer cladding layer to be in engagement with a long and a short side of the passageway.

21. The method of claim 16, wherein each optical fiber is secured within the passageway of a ferrule provided from a length of stock material in which contiguous end faces of ferrule segments of the length of stock material prior to separation from the length of stock material become adjacent end faces after termination of optical fibers with the direction of any eccentricity of each passageway of said ferrules falling in the same radial direction and termination of the optical fibers in the ferrules is such that each optical fiber is biased in the direction of any eccentricity of the associated passageway.

22. The method of claim 21, wherein prior to separation from the length of stock material, a free end portion of each ferrule portion is assembled to a housing which includes a tab, the assembly being accomplished to cause the tabs to be aligned longitudinally.

23. The method of claim 22, wherein the optical fibers are secured in the passageways to cause each fiber to be biased in the radial direction of the tab of the associated housing, and wherein each tab is normal to the parallel sides of the outer cladding layer of the optical fiber end portion disposed in the ferrule with which said tab is associated.

* * * * *